(12) United States Patent
Katz et al.

(10) Patent No.: US 11,398,904 B1
(45) Date of Patent: Jul. 26, 2022

(54) KEY MANAGEMENT FOR REMOTE DEVICE ACCESS

(71) Applicant: Marvell Asia Pte, Ltd., Singapore (SG)

(72) Inventors: Adi Katz, Ramat Gan (IL); Ruven Torok, Cholon (IL)

(73) Assignee: Marvell Asia Pte, Ltd., Singapore (SG)

(*) Notice: Subject to any disclaimer, the term of this patent is extended or adjusted under 35 U.S.C. 154(b) by 197 days.

(21) Appl. No.: 15/929,778

(22) Filed: May 21, 2020

Related U.S. Application Data

(60) Provisional application No. 62/850,998, filed on May 21, 2019.

(51) Int. Cl.
*H04L 9/08* (2006.01)
*H04L 9/40* (2022.01)

(52) U.S. Cl.
CPC .......... *H04L 9/0869* (2013.01); *H04L 9/0894* (2013.01); *H04L 63/045* (2013.01); *H04L 63/061* (2013.01); *H04L 63/062* (2013.01)

(58) Field of Classification Search
CPC ....... H04L 9/0869; H04L 9/08; H04L 9/0894; H04L 9/32; H04L 9/3263; H04L 9/0838; H04L 9/0844; H04L 63/06; H04L 63/061; H04L 63/062
See application file for complete search history.

(56) References Cited

U.S. PATENT DOCUMENTS

| | | | |
|---|---|---|---|
| 5,802,590 A * | 9/1998 | Draves | G06F 9/468 711/163 |
| 2010/0046452 A1* | 2/2010 | Kim | H04L 29/1232 370/329 |
| 2016/0170910 A1* | 6/2016 | Inamdar | G06F 12/1036 711/163 |
| 2017/0195993 A1* | 7/2017 | Cole | G06Q 20/18 |
| 2020/0287915 A1* | 9/2020 | Neuvirth | H04L 63/1416 |
| 2021/0208940 A1* | 7/2021 | Kalaichelvan | G06F 21/10 |

OTHER PUBLICATIONS

InfiniBand™ Architecture Release 1.3, vol. 1—General Specifications, Mar. 3, 2015, pp. 1, 2, 111, 112.

* cited by examiner

*Primary Examiner* — Shaqueal D Wade-Wright

(57) ABSTRACT

A method for allocating to a resource, in a system of addressable resources, a hybrid deterministic/random key for access to a second resource, includes maintaining a table of storage positions for key values, searching the table for an available storage position, determining an index, in the table, of the available storage position, generating a random key value associated with location of the second resource, storing the random key value in the storage position, and assembling the index and the random key value into the hybrid key. The index may be most significant bits of the hybrid key, with the random key value being the least significant bits. Alternatively, the index may be least significant bits of the hybrid key, with the random key value being the most significant bits, or the bits of the index may be distributed among bits of the random key value.

20 Claims, 4 Drawing Sheets

KEY MANAGEMENT FOR REMOTE DEVICE ACCESS

CROSS REFERENCE TO RELATED APPLICATION

This disclosure claims the benefit of commonly-assigned U.S. Provisional Patent Application No. 62/850,998, filed May 21, 2019, which is hereby incorporated by reference herein in its entirety.

FIELD OF USE

This disclosure relates to the management of keys for the access of data processing resources. More particularly, this disclosure relates to a method and apparatus for faster, more reliable allocation and look-up of keys for the access of data processing resources.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In many types of systems for processing, storage or communication of data, different resources that handle data may be shared. For example, in Remote Direct Memory Access (RDMA) systems, a processor may be able to access a memory storage device at a remote location using DMA techniques. In such systems, addressing of the remote resources is required. In order to minimize addressing errors, instead of using straightforward addresses, a second resource may address a first resource using a random key associated with the first resource. The random key is stored, along with random keys associated with other resources in the system, in a table along with data specifying the resource with which each key is associated. In order to address the first resource, the second resource specifies the random key of the first resource, and the random key may be looked up in the table using hashing techniques to accelerate the look-up process. However, more than one key may have the same hash, which could result in multiple look-up hits that slow down the identification of the first resource.

SUMMARY

A method, according to implementations of the subject matter of this disclosure, for allocating, to a first resource in a system of addressable resources, a hybrid deterministic/random key for access to a second resource in the system of addressable resources, includes maintaining a table of storage positions for key values, searching the table for an available storage position, determining an index, in the table, of the available storage position, generating a random key value associated with location of the second resource, storing the random key value in the storage position represented by the index, and assembling the index and the random key value into the hybrid deterministic/random key.

In a first implementation of such a method, the assembling may include assigning the index as the most significant bits of the hybrid deterministic/random key, and concatenating the random key value to the index as the least significant bits of the hybrid deterministic/random key. As an alternative, in a second implementation of the method, the assembling may include assigning the random key value as the most significant bits of the hybrid deterministic/random key, and concatenating the index to the random key value as the least significant bits of the hybrid deterministic/random key. As a further alternative, in a third implementation of the method, the assembling may include distributing bits of the index among bits of the random key value.

In a fourth implementation of such a method, when the network operates under a protocol that specifies a particular number of bits for the hybrid deterministic/random key, the assembling may include determining a maximum number of random key values that can be stored in the table, and reserving, for the index, a number of bits of the key sufficient to identify the maximum number of keys.

A method, according to implementations of the subject matter of this disclosure, for operating a system of addressable resources in which a first resource accesses a second resource using a hybrid deterministic/random key to minimize addressing errors, includes allocating, to a first resource in the system of addressable resources, a hybrid deterministic/random key for access to a second resource in the system of addressable resources, where the allocating includes maintaining a table of storage positions for key values, searching the table for an available storage position, determining an index, in the table, of the available storage position, generating a random key value associated with the second resource, storing the random key value in the storage position represented by the index, and assembling the index and the random key value into the hybrid deterministic/random key, and when the first resource seeks to access the second resource using the hybrid deterministic/random key, extracting the index and the random key value from the hybrid deterministic/random key, looking up an entry in the table based on the index extracted from the hybrid deterministic/random key, and comparing the entry to the random key value extracted from the hybrid deterministic/random key.

A first implementation of such a method may further include, when the comparing reveals that the random key value extracted from the hybrid deterministic/random key matches the entry, establishing a data connection between the first resource and the second resource.

In a second implementation of such a method, the assembling may include assigning the index as the most significant bits of the hybrid deterministic/random key, and concatenating the random key value to the index as the least significant bits of the hybrid deterministic/random key. As an alternative, in a third implementation of such a method, the assembling may include assigning the random key value as the most significant bits of the hybrid deterministic/random key, and concatenating the index to the random key value as the least significant bits of the hybrid deterministic/random key. As a further alternative, in a third implementation of such a method, the assembling may include distributing bits of the index among bits of the random key value.

In a fourth implementation of such a method, when the network operates under a protocol that specifies a particular number of bits for the hybrid deterministic/random key, the assembling may include determining a maximum number of key values that can be stored in the table, and reserving, for bits representing the index, a number of bit positions of the hybrid deterministic/random key sufficient to identify the maximum number of key values.

In that fourth implementation, the reserving may include reserving, for bits representing the index, a number of bit positions of the hybrid deterministic/random key sufficient to identify the maximum number of key values without reserving more bit positions than are necessary to identify the maximum number of key values.

According to implementations of the subject matter of this disclosure, a system of addressable resources includes at least a first resource and a second resource, where the first resource accesses the second resource using a hybrid deterministic/random key to minimize addressing errors. The system also includes memory for maintaining a table of storage positions for key values, a random key value generator, and a controller configured to allocate, to the first resource, the hybrid deterministic/random key for access to the second resource, by searching the table for an available storage position, determining an index, in the table, of the available storage position, generating, using the random key value generator, a random key value and associating the random key value with the second resource, storing the random key value in the storage position represented by the index, and assembling the index and the random key value into the hybrid deterministic/random key.

In a first implementation of such a system, when the first resource seeks to access the second resource using the hybrid deterministic/random key, the controller may extract the index and the random key value from the hybrid deterministic/random key, look up an entry in the table based on the index extracted from the hybrid deterministic/random key, compare the entry to the random key value extracted from the hybrid deterministic/random key, and when comparison reveals that the random key value extracted from the hybrid deterministic/random key matches the entry, establish a data connection between the first resource and the second resource.

In a second implementation of such a system, the controller may assemble the hybrid deterministic/random key by assigning the index as the most significant bits of the hybrid deterministic/random key, and concatenating the random key value to the index as the least significant bits of the hybrid deterministic/random key. As an alternative, in a third implementation of such a system, the controller may assemble the hybrid deterministic/random key by assigning the random key value as the most significant bits of the hybrid deterministic/random key, and concatenating the index to the random key value as the least significant bits of the hybrid deterministic/random key. As a further alternative, in a fourth implementation of such a system, the controller may assemble the hybrid deterministic/random key by distributing bits of the index among bits of the random key value.

A fourth implementation of such a system may operate under a protocol that specifies a particular number of bits for the hybrid deterministic/random key. In a variant of that fourth implementation, the controller may assemble the hybrid deterministic/random key by determining a maximum number of key values that can be stored in the table, and reserving, for bits representing the index, a number of bit positions of the hybrid deterministic/random key sufficient to identify the maximum number of key values. In a further variant of that implementation, the controller may reserve, for bits representing the index, a number of bit positions of the hybrid deterministic/random key sufficient to identify the maximum number of key values without reserving more bit positions than are necessary to identify the maximum number of key values.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
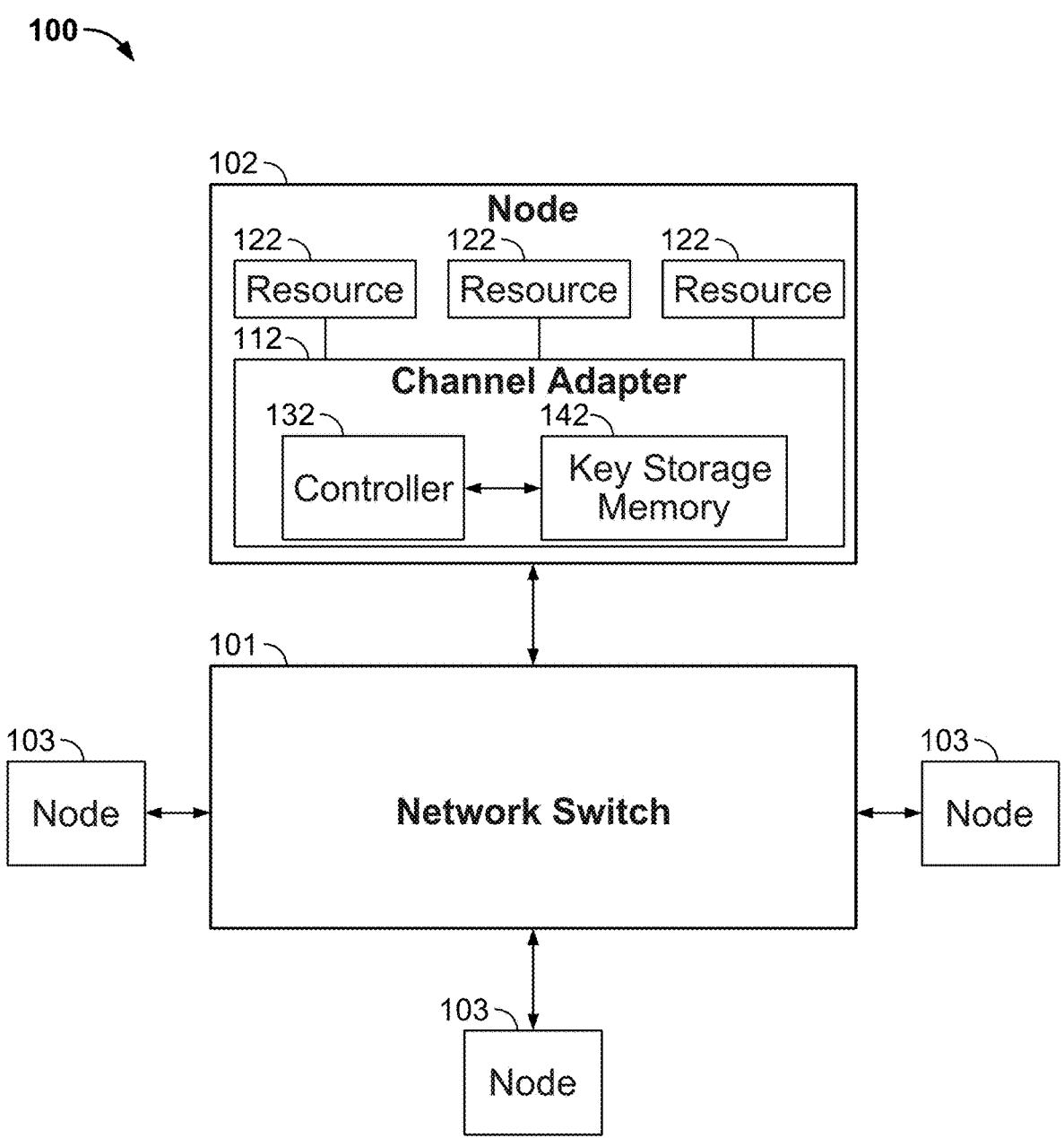
FIG. 1 shows a network, or network segment, in which the subject matter of this disclosure may be used.

As noted above, in systems (e.g., Remote Direct Memory Access (RDMA) systems, such as the INFINIBAND® switched-fabric high-performance networking standard administered by the InfiniBand Trade Association®) where resources directly address other resources, rather than the operating system of a central resource controlling communications between resources, a scheme for addressing of the remote resources is required. Although described herein in the context of an RDMA system such as an INFINIBAND system, implementations of the subject matter of this disclosure may be used with any system of addressable resources including local addressable resource.

In order to minimize addressing errors, instead of using straightforward addresses that may be consecutive and therefore result in an incorrect address being sent in error (or received in error because of transmission errors), a second resource may address a first resource using a random key associated with the first resource. The random key is stored, along with random keys associated with other resources in the system, in a table along with data specifying the resource with which each key is associated. In order to address the first resource, the second resource specifies the random key of the first resource, and the random key may be looked up in the table using hashing techniques to accelerate the look-up process. However, more than one key may have the same hash, which could result in multiple look-up hits (i.e., hash collisions) that slow down the identification of the second resource. At the same time, any addressing scheme must operate within the restrictions of the addressing protocol mandated by the system.

Therefore, in accordance with implementations of the subject matter of this disclosure, collision-free key look-up is achieved using the same field that is provided, in accordance with the protocol in use, for the key. No additional field is required, nor does the existing field need to be enlarged.

Specifically, a controller in the system maintains a list of keys that identify specific resources. The key is a data field that, according to the standard in use, such as the aforementioned INFINIBAND standard, has a certain length. Typically, when a key is allocated to a first resource, a random string or value, having that length, is generated and stored in a key table. Then, when a second resource, that previously has been provided with a key, requires access to the first resource, the second resource will send a request, including the key, to the controller, asking to access the first resource. The controller will look up the key in the key table (e.g., using a hashing technique as noted above) and, assuming the controller finds the key in the key table, the controller will grant the second resource access to the resource associated with the key (i.e., the first resource).

In accordance with implementations of the subject matter of this disclosure, key generation and key look-up are modified, while still conforming to the system protocol. The key field, having the prescribed length, is divided into two portions or sub-fields. One portion or sub-field is allocated to a random string or value generated in a manner similar to the typical protocol, but having fewer characters or digits, to provide space for the second portion or sub-field. The second portion or sub-field is a unique index of the key into the key table. The result is a key that is a hybrid of a deterministic portion (the unique index) and a random portion.

In order to maintain the maximum possible number of characters or digits for the first sub-field which contains the random string or value, the size of the second sub-field, which contains the index, may be limited to the minimum number of characters or digits required to represent the largest number of indices that may be needed in the system. That is, the size of the second sub-field, which contains the index, may be limited to the minimum number of characters or digits required to represent the largest number of entries that may be entered into the table (i.e., the size of the table).

Thus, if the keys are binary—i.e., only 1's and 0's—and the key table can hold max_number entries, then the number of bits in the second sub-field is equal to $$\mathrm{ceil}(\log_2(\mathrm{max\_number})).$$

The registration of keys may be performed by a system node with management functions. In an INFINIBAND system, keys are generated and stored at a channel adapter to which the node in question is connected. Still in the context of an INFINIBAND system, the keys under discussion are the Memory Keys (a local key, L_Key and a remote key, R_key) that are used by resources to communicate with one another. The R_key, in particular, is the key that a resource uses to communicate with another resource.

When a new resource is added to the system, the responsible management device (e.g., the controller in an INFINIBAND channel adapter) creates a key by assigning a key value, which may be in the form of a random number. The management device searches its associated key table to find an empty entry into which the key for the new resource may be stored. The index (e.g., in binary form) of that empty entry is merged with key value to create a hybrid random/deterministic key for the new resource. As noted above, the total number of bits used for each key, including the key value and the index, is specified in the standard (in the implementations described herein, the INFINIBAND standard) under which the system operates. The number of bits used for the index is $$\mathrm{ceil}(\log_2(\mathrm{max\_number})),$$

where max_number is the maximum number of indices that may be stored in the key table. The remaining bits of the hybrid random/deterministic key are available for the key value.

The merger of the key value and the index may be a simple concatenation. The positions of the key value and the index in the concatenated key are not important, as long as they are uniform in any particular implementation. Thus, the index may be at the beginning (i.e. the most significant bits) of the hybrid random/deterministic key or at the end (i.e., the least significant bits) of the hybrid random/deterministic key.

Alternatively, the merger of the key value and the index may be more complex. For example, the index may be inserted between two portions of the key value. Again, the particular bit positions used for the index in such an implementation are not important, as long as the same bit positions are used for all keys in a particular implementation.

According to another alternative, bits of the index may be distributed (e.g., as by interleaving) to predetermined bit locations within the hybrid random/deterministic key. Again, the particular bit locations to which bits of the index are distributed are not important as long as the same positions are used in all keys in the particular implementation.

The subject matter of this disclosure may be better understood by reference to FIGS. 1-4.

FIG. 1 shows a network, or network segment, in which the subject matter of this disclosure may be used. Network 100 includes a switch 101 and a plurality of nodes 102, 103. In the context of an INFINIBAND system, each node 102, 103 includes (not shown in nodes 103) a channel adapter 112 connected to one or more system resources 122. Channel adapter 112 includes a controller 132 that, among other functions, generates the random portion of the R_key described above, and communicates that random R_key portion to other nodes in the network via one or more network switches 101 (only one network switch 101 is shown in FIG. 1).

In an INFINIBAND system as described above, controller 132 of channel adapter 112 may allocate keys using the ibv_reg_mr Linux library function (available, at least, at https://linux.die.net/man/3/ibv_reg_mr) to register a memory region (MR). That function has the following format:

include <infiniband/verbs.h>
struct ibv_mr *ibv_reg_mr(struct ibv_pd *pd, void *addr, size_t length, int access);
int ibv_dereg_mr(struct ibv_mr *mr);

This function registers a memory region (MR) associated with a "protection domain" pd. The MR has a starting address addr and a size length. The argument access describes the desired memory protection attributes; it is either 0 or the bitwise OR of one or more of the following flags:

IBV_ACCESS_LOCAL_WRITE (Enable Local Write Access)
IBV_ACCESS_REMOTE_WRITE (Enable Remote Write Access)
IBV_ACCESS_REMOTE_READ (Enable Remote Read Access)
IBV_ACCESS_REMOTE_ATOMIC (Enable Remote Atomic Operation Access; if supported)
IBV_ACCESS_MW_BIND (Enable Memory Window Binding)

If IBV_ACCESS_REMOTE_WRITE or IBV_ACCESS_REMOTE_ATOMIC is set, then IBV_ACCESS_LOCAL_WRITE must be set as well. Local read access is always enabled for the MR.

The ibv_reg_mr function, if successful, returns a pointer to the registered MR. The pointer may include a local key (L_Key) field, and a remote key (R_key) field which is the aforementioned random key used by remote processes to perform operations such as RDMA. The R_key is sent by controller 132 to controller 131 of network switch 101.

Each channel adapter 112 includes memory 142 for key storage, which includes a plurality (max_number) of memory slots 211 (FIG. 2) for storing keys to various resources 122. The number of memory slots dictates a number of bits needed to uniquely identify each slot, as set forth above:

$$\mathrm{ceil}(\log_2(\mathrm{max\_number}))$$

Controller 132 is aware of this number of bits, and creates each random R_key portion with a number of bits that, when added to the number of bits needed to identify a memory slot, is the number of bits reserved for the keys according to the relevant standard (e.g., INFINIBAND).

Controller 132 takes the R_key portion 212, identifies a slot into which that key will be stored, appends the identification 222 of the slot to the random R_key portion to create a composite key 232 (i.e., a hybrid random/deterministic key as described above), and stores that composite key in the identified slot along with a pointer 233 to the resource 122 to which the R_key belongs.

In a typical INFINIBAND system, controller 132, on behalf of a resource 122 in node 102 will communicate the R_key of resource 122 to resources in nodes 103 with which resource 122 would like to communicate, so that resources in nodes 103 can access resource 122 in node 102 (the distinction between node 102 and nodes 103 is illustrative only; a resource in any node can provide its R_key to any resource in any other node).

When a resource in one of those nodes 103 seeks to communicate with resource 122 in node 102, the resource in the one of nodes 103 will send a request, including the composite key for resource 122 in node 102, onto the network via network switch 101, addressed to node 102 according to a lower-level network addressing protocol. Controller 132 in target node 102 will examine the request, identify the bits of the composite key that identify the slot in key storage 142 and will retrieve the composite key, along with the resource pointer, from that slot. Controller 132 will then compare the generated R_key portion 212 of the retrieved composite key 222 with the R_key portion of the received composite key. If the R_key portions match, controller 132 will connect the remote resource at node 103 to the resource at node 102 based on the associated resource pointer 231 also retrieved from key storage 142.

Figure 2:
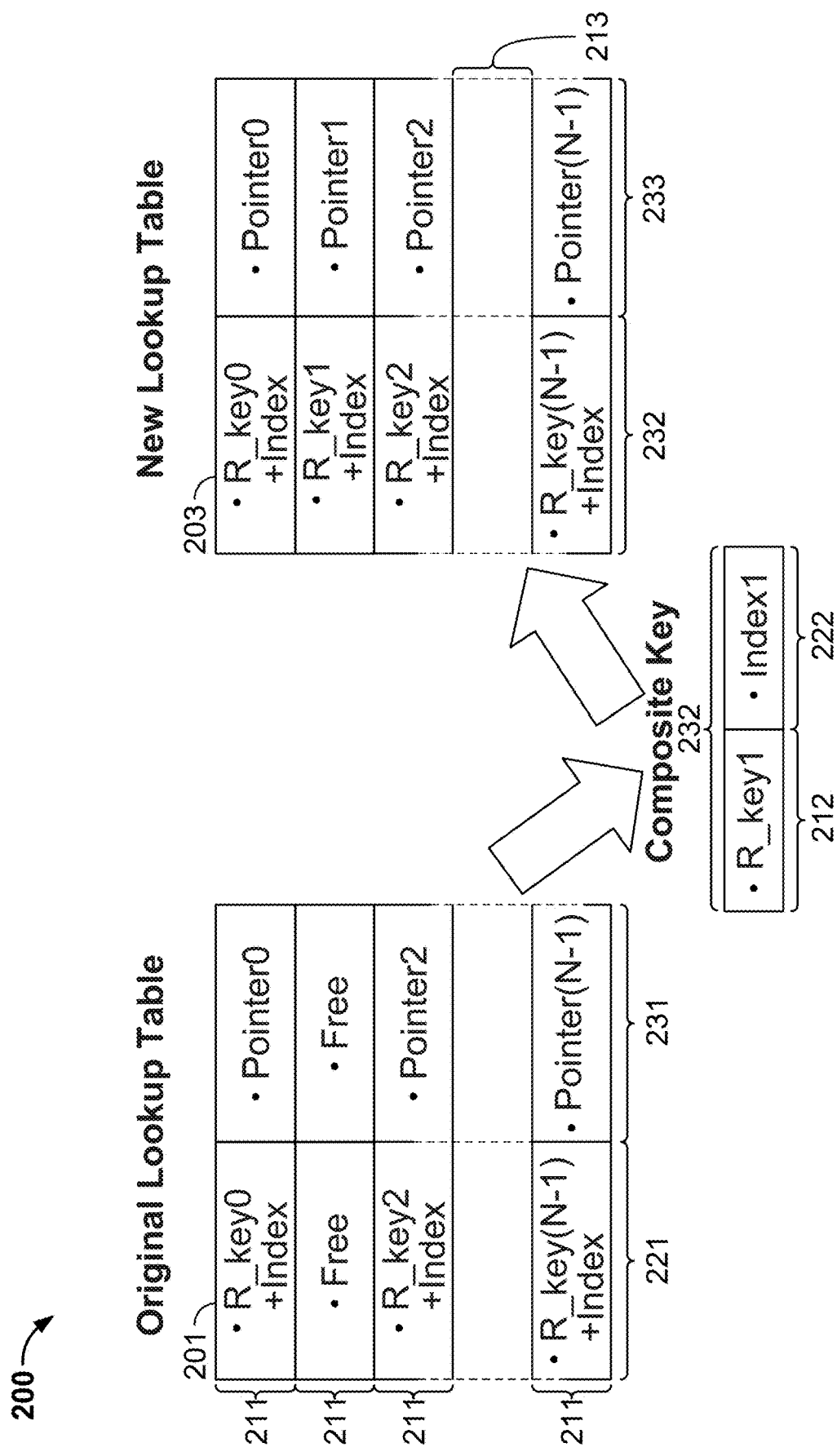
FIG. 2 is a visualization of key allocation in accordance with an implementation of the subject matter of this disclosure.

The key generation process 200 is visualized in FIG. 2. Original contents of key storage 142 are shown at 201, with N slots (0, . . . , N−1) 211, of which at least the second slot (slot index=1) is empty or free. Each occupied one of slots 211 includes a composite key 221 including a random R_key portion and an index, and associated pointer 231. When a new random R_key portion 212 is generated, empty slot 213 is identified and index 222 of slot 213 is appended to random R_key portion 212 to create composite key 232, which is stored in slot 213, along with a pointer 231, as shown in revised table 203.

Figure 3:
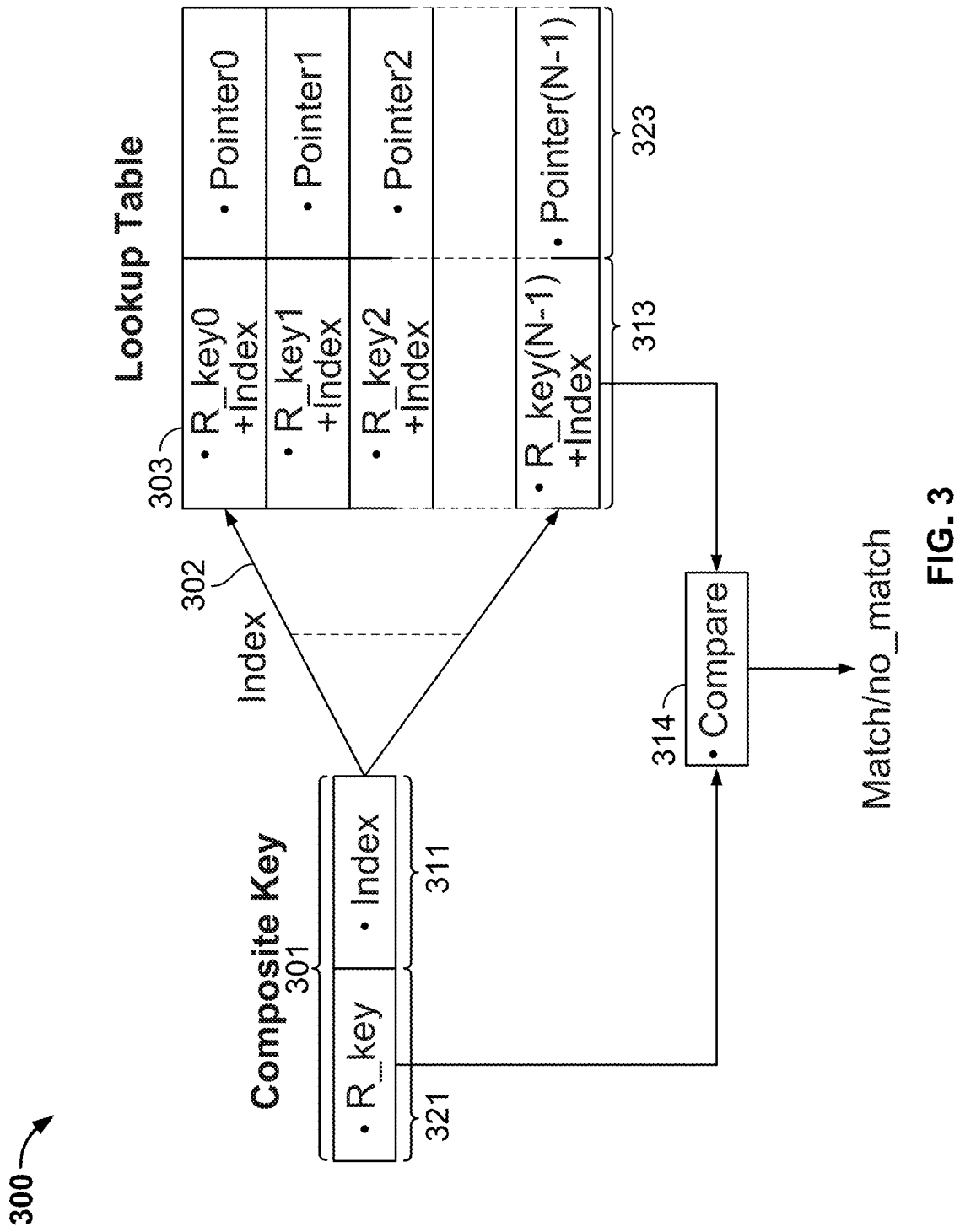
FIG. 3 is a visualization of key lookup in accordance with an implementation of the subject matter of this disclosure.

The key lookup process 300 is visualized in FIG. 3. When a composite key 301 is received, index 311 is extracted and used at 302 to look up the corresponding R_key 313 in table 303. The random R_key portion is extracted from composite key 313 and compared at 304 to the random R_key portion of composite key 301. If the result of comparison 304 is a match, then the corresponding pointer 323 is used to connect the requesting resource to the target resource.

Figure 4:
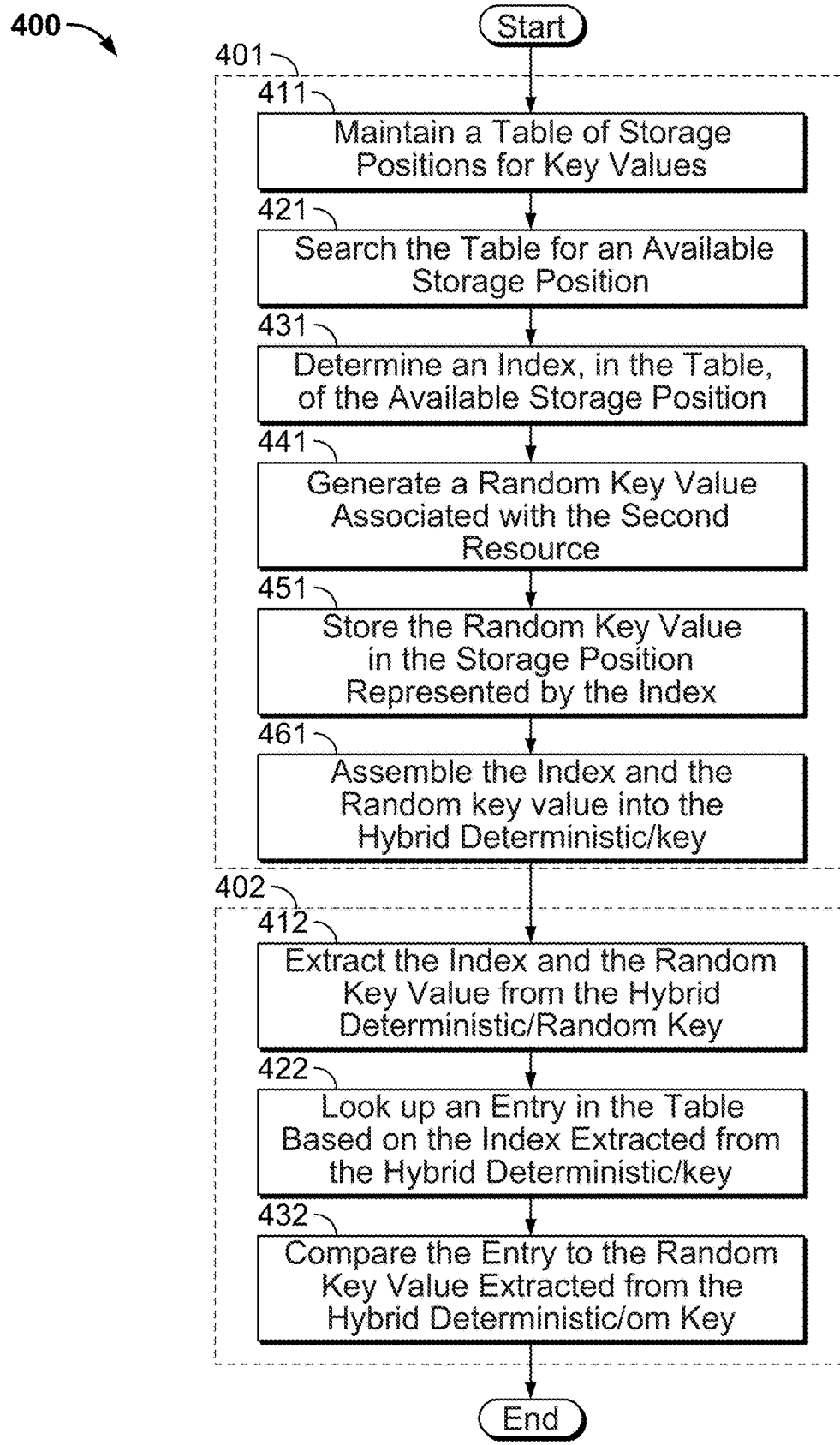
FIG. 4 is a flow diagram illustrating a method according to an implementation of the subject matter of this disclosure.

A method 400 according to implementations of the subject matter of this disclosure is diagrammed in FIG. 4.

Method 400 begins with key allocation 401, which is followed by key lookup 402, before ending.

Key allocation 401 includes maintaining a table of storage positions for key values (411), searching the table for an available storage position (421), determining an index, in the table, of the available storage position (431), generating a random key value associated with the second resource (441), storing the random key value in the storage position represented by the index (451), and assembling the index and the random key value into the hybrid deterministic/random key (461).

Key lookup 402 includes extracting the index and the random key value from the hybrid deterministic/random key (412), looking up an entry in the table based on the index extracted from the hybrid deterministic/random key (422), and comparing the entry to the random key value extracted from the hybrid deterministic/random key (432).

Thus it is seen that a method and apparatus for collision-free key look-up have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of allocating, to a first resource in a network of addressable resources, a hybrid deterministic/random key for access to a second resource in the network of addressable resources, the method comprising:

maintaining, at a management device in the network of addressable resources, a table of storage positions for key values;

searching the table, using the management device, for an available storage position;

determining, using the management device, an index, in the table, of the available storage position;

generating, using the management device, a random key value associated with location of the second resource;

storing, using the management device, the random key value in the storage position represented by the index;

assembling, using the management device, the index and the random key value into the hybrid deterministic/random key, the hybrid deterministic/random key being stored in the available storage position in the table in the management device; and using the hybrid deterministic/random key to access the second resource in the network of addressable resources.

2. The method of claim 1 wherein the assembling comprises:

assigning the index as the most significant bits of the hybrid deterministic/random key; and concatenating the random key value to the index as the least significant bits of the hybrid deterministic/random key.

3. The method of claim 1 wherein the assembling comprises:

assigning the random key value as the most significant bits of the hybrid deterministic/random key; and concatenating the index to the random key value as the least significant bits of the hybrid deterministic/random key.

4. The method of claim 1 wherein the assembling comprises distributing bits of the index among bits of the random key value.

5. The method of claim 1 wherein, when the network operates under a protocol that specifies a particular number of bits for the hybrid deterministic/random key, the assembling comprises:

determining a maximum number of random key values that can be stored in the table; and reserving, for the index, a number of bits of the key sufficient to identify the maximum number of keys.

6. A method of operating a network of addressable resources in which a first resource accesses a second resource using a hybrid deterministic/random key to minimize addressing errors, the method comprising:
   allocating, to a first resource in the network of addressable resources, a hybrid deterministic/random key for access to a second resource in the network of addressable resources, the allocating comprising:
   maintaining a table of storage positions for key values,
   searching the table for an available storage position,
   determining an index, in the table, of the available storage position,
   generating a random key value associated with the second resource,
   storing the random key value in the storage position represented by the index, and
   assembling the index and the random key value into the hybrid deterministic/random key; and
   when the first resource seeks to access the second resource using the hybrid deterministic/random key:
   extracting the index and the random key value from the hybrid deterministic/random key,
   looking up an entry in the table based on the index extracted from the hybrid deterministic/random key, and comparing the entry to the random key value extracted from the hybrid deterministic/random key.

7. The method of claim 6 further comprising:
   when the comparing reveals that the random key value extracted from the hybrid deterministic/random key matches the entry, establishing a data connection between the first resource and the second resource.

8. The method of claim 6 wherein the assembling comprises:
   assigning the index as the most significant bits of the hybrid deterministic/random key; and
   concatenating the random key value to the index as the least significant bits of the hybrid deterministic/random key.

9. The method of claim 6 wherein the assembling comprises:
   assigning the random key value as the most significant bits of the hybrid deterministic/random key; and
   concatenating the index to the random key value as the least significant bits of the hybrid deterministic/random key.

10. The method of claim 6 wherein the assembling comprises distributing bits of the index among bits of the random key value.

11. The method of claim 6 wherein, when the network operates under a protocol that specifies a particular number of bits for the hybrid deterministic/random key, the assembling comprises:
    determining a maximum number of key values that can be stored in the table; and
    reserving, for bits representing the index, a number of bit positions of the hybrid deterministic/random key sufficient to identify the maximum number of key values.

12. The method of claim 11 wherein the reserving comprises reserving, for bits representing the index, a number of bit positions of the hybrid deterministic/random key sufficient to identify the maximum number of key values without reserving more bit positions than are necessary to identify the maximum number of key values.

13. A network of addressable resources, the network comprising:
    at least a first resource and a second resource, the first resource accessing the second resource using a hybrid deterministic/random key to minimize addressing errors;
    memory for maintaining a table of storage positions for key values;
    a random key value generator; and
    a hardware controller configured to allocate, to the first resource, the hybrid deterministic/random key for access to the second resource, by:
    searching the table for an available storage position,
    determining an index, in the table, of the available storage position,
    generating, using the random key value generator, a random key value and associating the random key value with the second resource,
    storing the random key value in the storage position represented by the index, and
    assembling the index and the random key value into the hybrid deterministic/random key; wherein:
    the hardware controller is further configured to:
    when the first resource seeks to access the second resource using the hybrid deterministic/random key:
    extract the index and the random key value from the hybrid deterministic/random key,
    look up an entry in the table based on the index extracted from the hybrid deterministic/random key, and
    compare the entry to the random key value extracted from the hybrid deterministic/random key.

14. The network of claim 13 wherein:
    when comparison reveals that the random key value extracted from the hybrid deterministic/random key matches the entry, the hardware controller establishes a data connection between the first resource and the second resource.

15. The network of claim 13 wherein the hardware controller assembles the hybrid deterministic/random key by:
    assigning the index as the most significant bits of the hybrid deterministic/random key; and
    concatenating the random key value to the index as the least significant bits of the hybrid deterministic/random key.

16. The network of claim 13 wherein the hardware controller assembles the hybrid deterministic/random key by:
    assigning the random key value as the most significant bits of the hybrid deterministic/random key; and
    concatenating the index to the random key value as the least significant bits of the hybrid deterministic/random key.

17. The network of claim 13 wherein the hardware controller assembles the hybrid deterministic/random key by distributing bits of the index among bits of the random key value.

18. The network of claim 13 wherein the system operates under a protocol that specifies a particular number of bits for the hybrid deterministic/random key.

19. The network of claim 18 wherein the hardware controller assembles the hybrid deterministic/random key by:
    determining a maximum number of key values that can be stored in the table; and
    reserving, for bits representing the index, a number of bit positions of the hybrid deterministic/random key sufficient to identify the maximum number of key values.

20. The network of claim 19 wherein the hardware controller reserves, for bits representing the index, a number of bit positions of the hybrid deterministic/random key sufficient to identify the maximum number of key values without reserving more bit positions than are necessary to identify the maximum number of key values.

\* \* \* \* \*